(12) United States Patent
Chia et al.

(10) Patent No.: US 6,882,862 B1
(45) Date of Patent: Apr. 19, 2005

(54) METHOD FOR INTERFACING A PRIVATE BRANCH EXCHANGE WITH A WIRELESS COMMUNICATIONS NETWORK AND ALSO WITH THE PUBLIC SWITCHED TELEPHONE NETWORK

(75) Inventors: Shiann-An Chia, Edison, NJ (US); Ya-Tien Ko, Manalapan, NJ (US); Christopher Foard, Little Silver, NJ (US); William E. Corley, Piscataway, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/488,568

(22) Filed: Jan. 21, 2000

(51) Int. Cl.[7] .................................................. H04M 1/00
(52) U.S. Cl. ................. 455/555; 455/556.1; 455/554.1; 455/426.1; 455/500; 455/461; 455/462; 455/445; 379/242; 379/418; 379/201.01; 379/114.28; 379/114.29; 379/115.01
(58) Field of Search ............................... 455/555, 554.1, 455/461, 462, 445, 426.1, 500; 379/242, 418, 399, 114, 115, 201

(56) References Cited

U.S. PATENT DOCUMENTS

| | | | |
|---|---|---|---|
| 5,550,911 A | | 8/1996 | Bhagat et al. |
| 5,563,889 A | | 10/1996 | Gard et al. |
| 5,646,985 A | | 7/1997 | Andruska et al. |
| 5,875,242 A | * | 2/1999 | Glaser et al. .......... 379/201.05 |
| 5,920,815 A | * | 7/1999 | Akhavan .................. 455/426.1 |
| 5,978,672 A | * | 11/1999 | Hartmaier et al. .......... 455/413 |
| 5,999,813 A | * | 12/1999 | Lu et al. .................. 455/435.2 |
| 6,011,975 A | * | 1/2000 | Emery et al. ............. 455/456.1 |
| 6,014,377 A | * | 1/2000 | Gillespie .................... 370/351 |
| 6,075,985 A | * | 6/2000 | Kao ........................ 455/422.1 |
| 6,081,716 A | * | 6/2000 | Lu ............................. 455/445 |
| 6,359,880 B1 | * | 3/2002 | Curry et al. ................. 370/352 |
| 6,542,497 B1 | * | 4/2003 | Curry et al. ................. 370/352 |
| 6,580,906 B1 | * | 6/2003 | Bilgic et al. ............. 455/422.1 |
| 6,622,016 B1 | * | 9/2003 | Sladek et al. .......... 379/201.01 |
| 6,625,139 B1 | * | 9/2003 | Miloslavsky et al. ....... 370/352 |

* cited by examiner

Primary Examiner—Marceau Milord
(74) Attorney, Agent, or Firm—Birch, Stewart, Kolasch & Birch, LLP

(57) ABSTRACT

The present invention provides a system and method for using a standard private branch exchange (PBX), such as e.g., the Lucent Technologies, Inc. DEFINITY® PBX, for interfacing with a wireless (e.g., cellular, etc.) communication network and the public switched telephone network (PSTN). The system employs an adjunct controller and uses computer telephony integration (CTI) associated with a standard PBX to communicate directly with an audio switch and the PSTN. Through the use of CTI, the standard PBX also provides feedback to the caller. For example, when an inbound call arrives (i.e., from the PSTN to a radio transceiver), the adjunct controller determines whether the wireless system has available resources (i.e., an available link) to grant calls and instructs the PBX to provide an audio connection between dynamically assigned wireless links (e.g., RF channels). If no link is available, a busy signal is referred back to the PSTN, and eventually back to the originating switch.

48 Claims, 3 Drawing Sheets

METHOD FOR INTERFACING A PRIVATE BRANCH EXCHANGE WITH A WIRELESS COMMUNICATIONS NETWORK AND ALSO WITH THE PUBLIC SWITCHED TELEPHONE NETWORK

BACKGROUND OF THE INVENTION

1. Field of the Invention

The present invention relates to the field of communications. More specifically, it relates to a method through which any standard private branch exchange (PBX) is able to be interfaced with a wireless communications network and also with the public switched telephone network (PSTN).

2. Description of the Related Art

Today's business customers demand cost effective communications systems that satisfy a wide range of applications. These applications include basic and advanced voice call coverage and handling, station user mobility, call center solutions, telecommuting, data network connectivity, messaging, etc. Ease of operation and administration is always an important factor in selecting a communication system, as is the possibility of future expansion. To fulfill these and other needs, many businesses have employed private branch exchanges (PBXs).

Private branch exchanges are commonly employed in today's business communications systems for locally providing many of the above-identified features and services within an organization using telephone services while simultaneously acting as an analog or digital switchboard for connecting private telephone networks to the PSTN. For example, PBXs are typically utilized by groups of subscribers located in one geographic area, such as employees of a company located within a common building. The PBX services as few or as many users as the application requires.

Many different types of PBXs currently exist in the marketplace to provide such services. A problem that currently exists in the field of wireless communications, however, is the fact that standard PBXs, such as e.g., the Lucent Technologies, Inc. DEFINITY® system, are not compatible with the interface equipment (e.g., audio switches, etc.) used in many wireless networks. Moreover, the interface equipment (e.g., audio switches, etc.) are not compatible with the PSTN in that they do not necessarily implement all the protocols necessary to effectively communicate with the PSTN and, thereby connect the wireless system to the PSTN. Therefore, customers in need of wireless telephone services have been forced to specify and build expensive custom PBXs to interface with their wireless communications networks and the PSTN.

Turning to FIG. 1, a typical wireless communication system is depicted in which a wireless communications network 130 communicates with a custom PBX 115 which in turn communicates with a central office (CO); part of the PSTN 120. Within the wireless communications network 130, a plurality of wireless communication devices (e.g., radio transceivers) 100 wirelessly communicate with a two-way radio console 105 via a controller 125, which controls communication resource allocation (e.g., access to wireless links). An audio switch 110 is used to route audio throughout the wireless communication network 130 dependent upon instructions received from wireless communication network controller 125, as is known in the art. Typically, a custom designed PBX 115 is required to interface with the audio switch 110 and the PSTN 120 since currently, there does not exist a standard "off the shelf" PBX that is able to communicate with both a wireless communications network and the PSTN. The custom designed PBX 115 provides system users (i.e., those placing calls from a mobile transceiver unit 100 to a central office and vice versa) with many desirable features (such as e.g., those described above), and also serves as an interface between the wireless network 130 and the PSTN 120 for providing necessary signaling protocols to both the wireless network 130 and the PSTN 120, thereby enabling communication between individual transceivers 100 of the wireless communication network 130 and the central office.

While custom PBXs have performed satisfactorily for this application, they remain a very expensive alternative to standard "off the shelf" PBXs. Furthermore, customers relying upon these custom PBXs must also forego the tested quality, reputation, technical support system, scalability and reliability of a standard "off the shelf" PBX. In addition, forward compatibility (e.g., when new features are introduced) and maintenance support become very expensive with custom PBXs. Thus, a system and method for using a standard PBX to interface with both a wireless communications network and the PSTN is desirable.

SUMMARY OF THE INVENTION

The present invention provides a system and method for using a standard PBX, such as e.g., the Lucent Technologies, Inc. DEFINITY® PBX, for interfacing with a wireless (e.g., cellular, etc.) communication network and the PSTN. The system employs an adjunct controller using computer telephony integration (CTI) technology to communicate directly with interface equipment of the wireless network (e.g., an audio switch) and the PSTN. Through the use of CTI, the standard PBX also provides feedback to the caller. For example, when an inbound call arrives (i.e., from the PSTN to a radio transceiver), the adjunct controller determines whether the wireless system has available resources (i.e., an available link) to grant calls and instructs the PBX to provide an audio connection between dynamically assigned wireless links (e.g., RF channels). If no link is available, a busy signal is referred back to the PSTN, and eventually back to the caller via an originating switch.

BRIEF DESCRIPTION OF THE DRAWINGS

These and other features and advantages of the invention will become more readily apparent from the following detailed description which is provided in connection with the accompanying drawings in which.

DETAILED DESCRIPTION OF A PREFERRED EMBODIMENT

Figure 1:
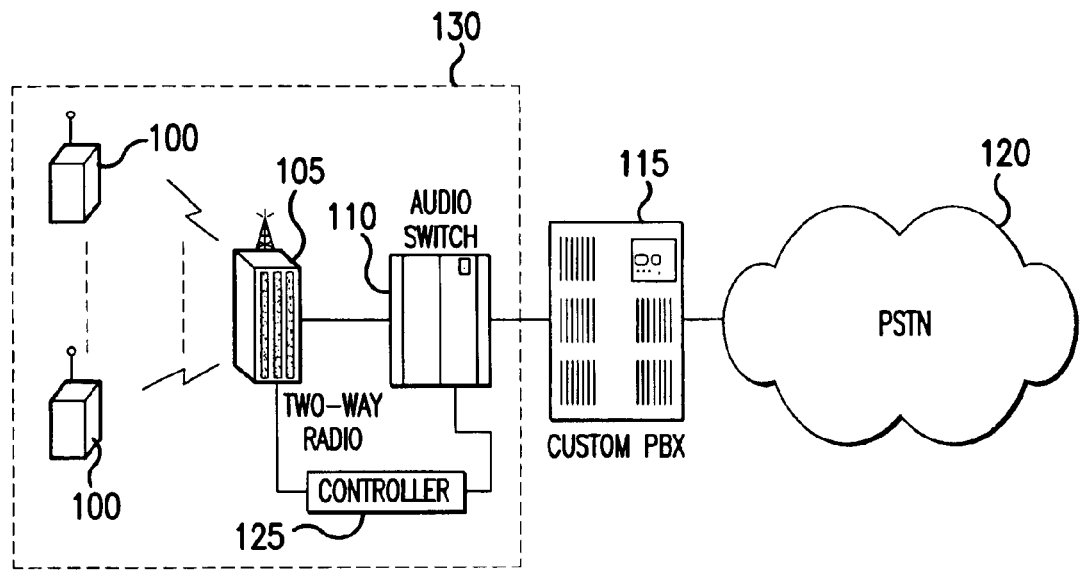
FIG. 1 illustrates a typical wireless communication system.
Figure 2:
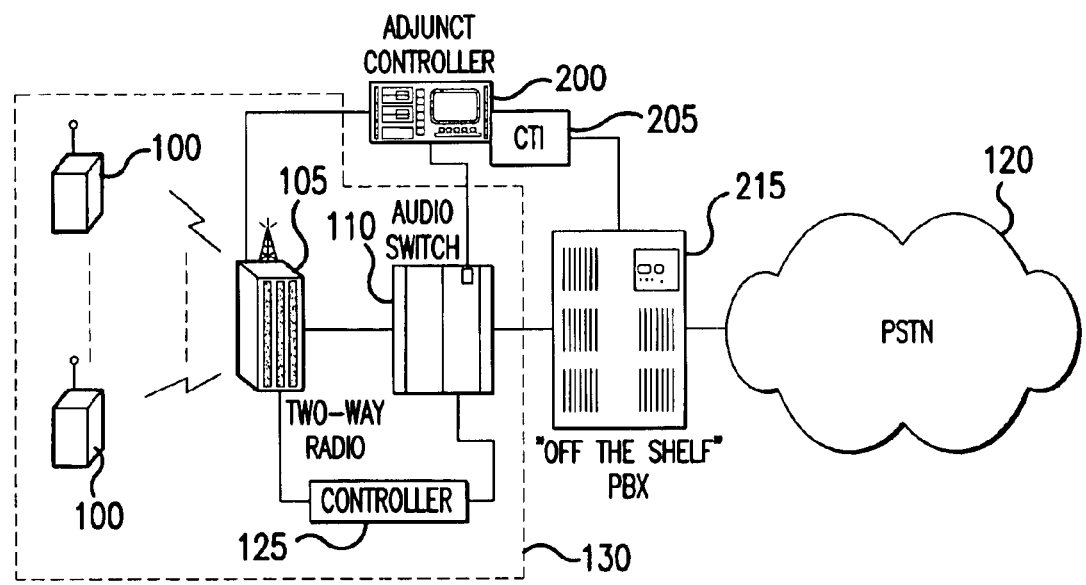
FIG. 2 illustrates a wireless communication network/PSTN interface in accordance with an embodiment of the invention.

FIG. 2 illustrates a wireless communication network/PSTN interface in accordance with an embodiment of the invention. An adjunct controller 200 is coupled to the two-way radio console 105, the audio switch 110 and the standard PBX 215. Adjunct controller 200 may be a central processing unit (CPU), a microprocessor, etc. The standard PBX 215 (PBX) may be e.g., the Lucent Technologies, Inc. DEFINITY® PBX, or a similar "off the shelf" product. The operation of standard PBX 215 is well known in the art and, therefore, will not be described herein. Similarly, the operation of an audio switch 110, such as e.g., the Motorola Inc. "Audio Electronics Bank" is also well known in the art and, therefore, will not be described herein.

Coupled to adjunct controller 200 is a device performing computer telephony integration (CTI) 205. CTI 205 acts as a link between adjunct controller 200 and the balance of the FIG. 2 system in that CTI 205 combines computer and telephone functions to enable adjunct controller 200 to control various telephony function within the FIG. 2 system such as placing and receiving voice, data and facsimile calls, etc. That is, via CTI 205, the adjunct controller 200 communicates with the standard PBX 215 and instructs the PBX 215 as to which particular protocol set is to be used. Controller 200 instructs the standard PBX as to the proper signaling protocols required to communicate with the PSTN 120 and the audio switch 110. In addition, the adjunct controller 200 interacts with the CTI 205 to instruct tile standard PBX 215 to inform the adjunct controller 200 of the status of an incoming call, including the status of a party or a station associated with the call.

For example, a call attempting to enter the PBX 215 from one of the mobile transceivers 100 might not be successful due to the unavailability of a link (i.e., the maximum number of links operated between two-way radio console 105 and the individual transceivers 100 has been reached). In such a case, the controller 200 instructs the standard PBX 215 to play back an appropriate verbal message to the calling transceiver 100, thereby informing the caller of the unavailability of wireless links.

Similarly, if a party is attempting to call a particular transceiver 100 of the FIG. 2 system, the controller 200 determines the availability of that particular wireless link. If the link is currently in use, the controller 200 instructs standard PBX 215 to play back a busy signal to the calling party (i.e., that calling party being beyond the PSTN 120). It should be noted that CTI 205 may be implemented in either hardware (e.g., an application specific integrated circuit (ASIC), etc.) or software. In addition, it should be noted that both controller 125 and adjunct controller 200 may reside within the same hardware.

Figure 3:
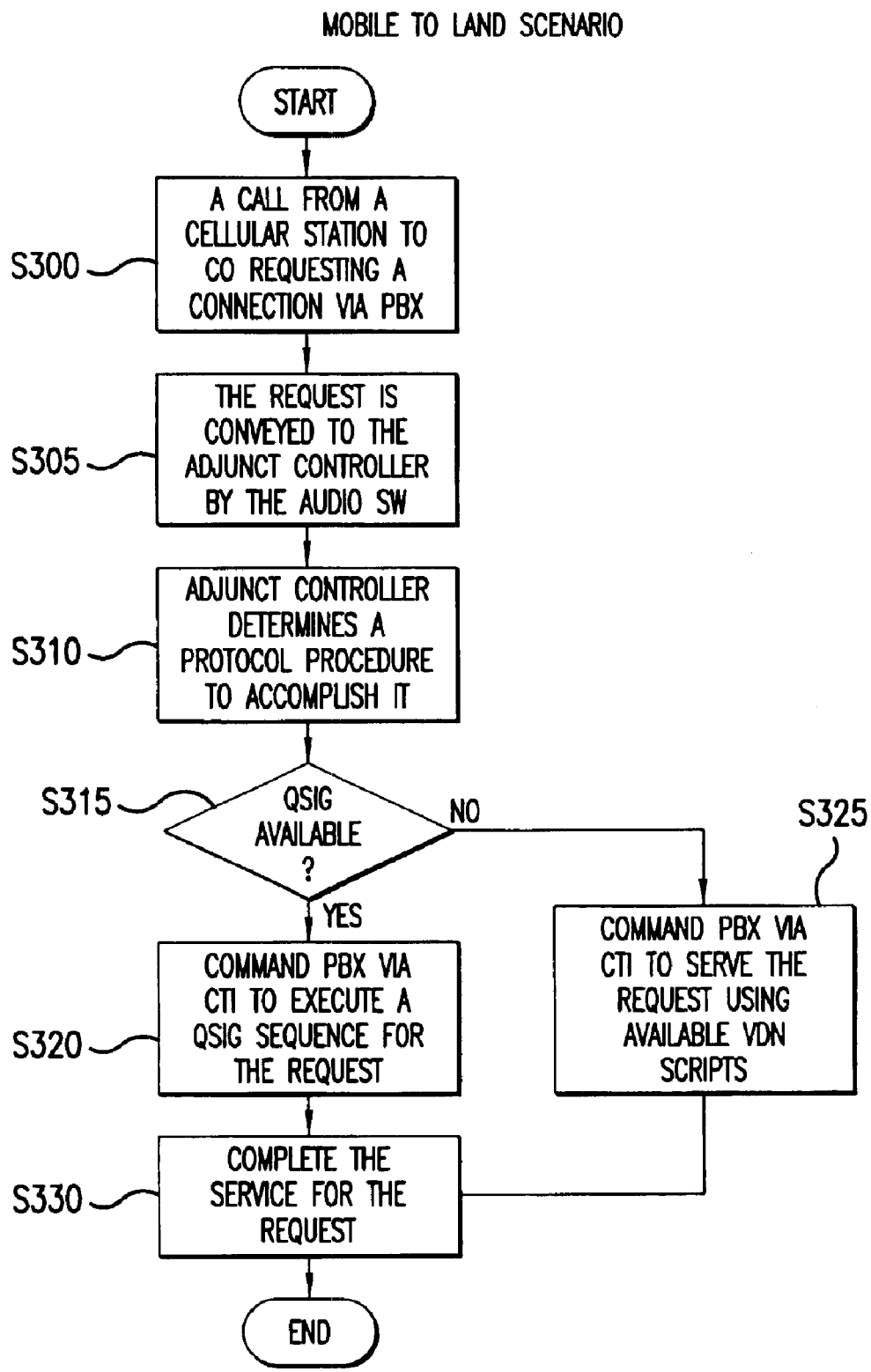
FIG. 3 illustrates a flowchart depicting an exemplary informational flow within the FIG. 2 system during communication in a direction from a mobile transceiver to the PSTN.

Turning now to FIG. 3, a flowchart depicting an exemplary informational flow within the FIG. 2 system is depicted during an attempted call setup. The call is being placed from a mobile transceiver 100 and must pass through the PSTN 120 in order to be completed. At step S300, the wireless communication network 130 receives notice of a call being attempted from a transceiver 100. That is, a call is being placed from a wireless transceiver 100 requesting a wireless link between itself and the two-way radio console 105, and also requesting a link between the audio switch 110 and the PSTN 120 via standard PBX 215. At step S305, audio switch 110 conveys the request to adjunct controller 200. At step S310, adjunct controller 200 determines a protocol with which to process the request. That is, the adjunct controller 200 determines the status of the caller, the availability of a link between the caller and the CO, etc. in deciding on a protocol. For example, the adjunct controller 200 can communicate with the two-way radio console 125 to determine whether there are any available wireless links to handle the call request. As another example, the adjunct controller 200 can determine whether the user is authorized to make calls within the wireless network 130, etc. As can be readily seen, the adjunct controller 200/CTI 205 of the FIG. 2 system may be configured to perform any number of different functions in order to meet the needs of a particular customer.

At step S315, the adjunct controller 200 determines whether a specific Q-signal (QSIG) procedure exists within the CTI 205. QSIG is a signaling standard. It is a common signaling protocol based upon the Integrated Services Digital Network (ISDN) Q.931 standard and is used by many private network providers for signaling between exchanges in the private sector.

As is known in the art, QSIG offers a number of standardized services and also supplies functions that enable providers of private networks to offer client-specific non-standardized services. Through these services, called generic functions, signaling information for non-standardized services can be transmitted transparently through the network. It is via these standard and non-standard services that the adjunct controller 200 will carry out the proper protocol as determined at step S310. That is, at step S320, if QSIG is available for the proper protocol, the adjunct controller 200 instructs the standard PBX 215, via CTI 205, to execute a specific QSIG sequence (e.g., do not allow the call to go through and send back a "no available links, try again later" message to the user if no wireless link is currently available, etc.).

If, in the above described example, no QSIG sequence is available to the adjunct controller 200, it will then instruct the PBX 215, at step S325, to carry out the proper protocol sequence via a Vector Directory Number (VDN) script. As is known in the art, VDNs are used with call vectoring systems. Call vectoring allows a service provider to "program" the type of processing applied to a call (or call attempt) by arranging a set of vector commands in a desired sequence, which in turn generates the needed protocol messages in a desired sequence.

For example, using the above scenario with regard to a call being attempted from a mobile transceiver 100 through the PSTN 120, depending upon the command, the service provider can have the adjunct controller 200 instruct the standard PBX 215 to place the attempted call in queue until a link (e.g., one of the wireless links connecting the transceivers 100 to the two-way radio console 125) is available. In addition, the adjunct controller 200 can have the PBX 215 play an appropriate recorded announcement (i.e., vector script) to the caller, etc.

Call vectoring permits each call to be treated uniquely according to a number of factors. Those factors include, but are not limited to, the number of potential callers, the phone number from which the call is made, the number of calls in queue, the time of day and/or day of the week, etc. The "directory" of such a call vectoring system are the VDNs. A VDN is an internal reference number that, in turn, directs the call to a specific vector (i.e., set of handling instructions). Specifically, the vector is a set of commands that define the processing of a call. Each individual vector can contain up to 32 command steps. Furthermore, multiple vectors may be joined together to extend processing capabilities far beyond the few simple examples provided herein. Finally, at step S330, the proper protocol, selected by the adjunct controller 200 and carried out by either QSIG or VDN scripts, is completed.

Figure 4:
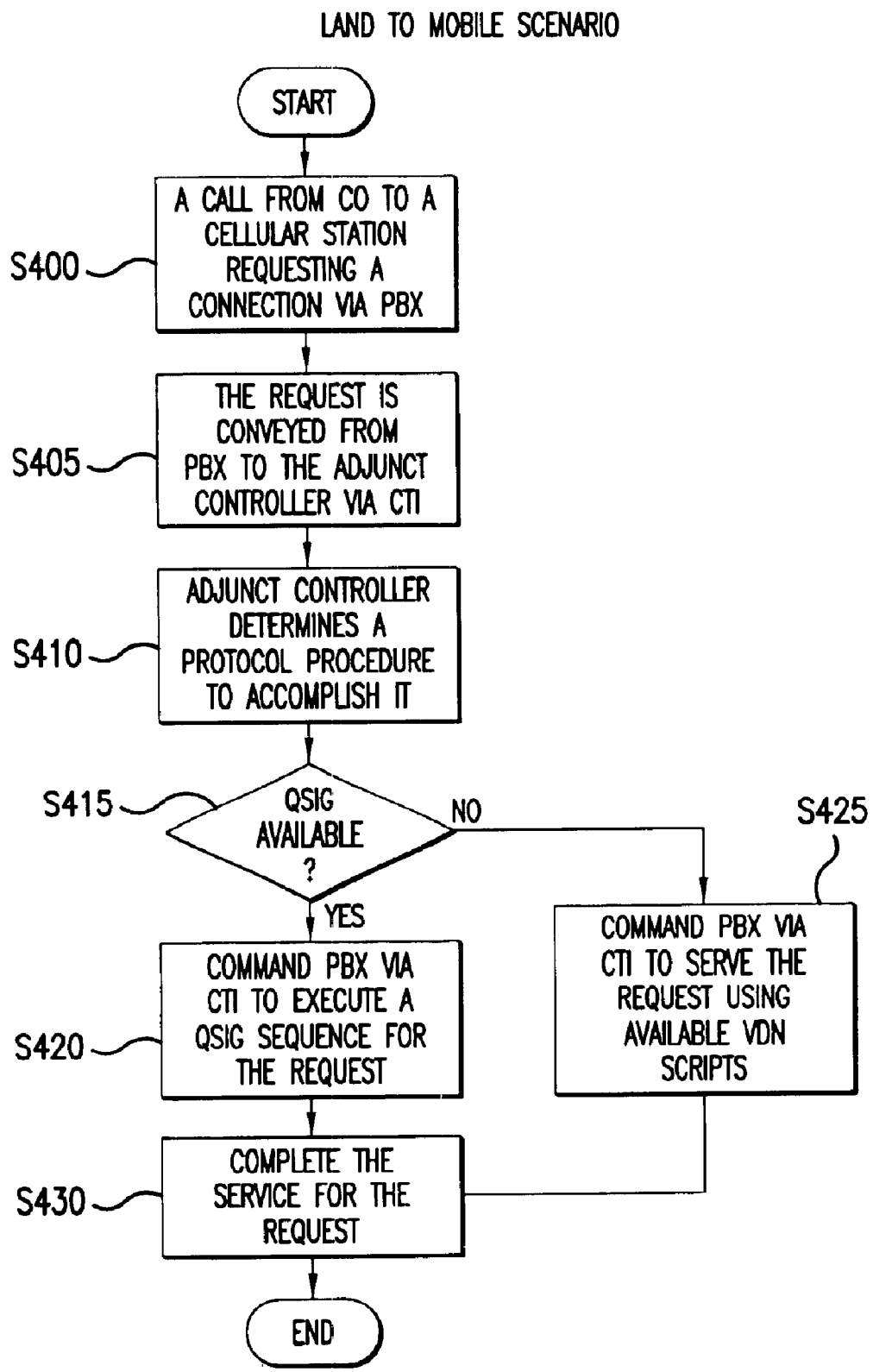
FIG. 4 illustrates a flowchart depicting an exemplary informational flow within the FIG. 2 system during communication in a direction from the PSTN to a mobile transceiver.

Turning to FIG. 4, a flowchart depicting an exemplary informational flow within the FIG. 2 system is depicted during an attempted call setup. In this case, as contrasted with the FIG. 3 flowchart, the call is being placed by a caller beyond the PSTN 120 to a mobile transceiver 100 within the wireless network 130. At step S400, the wireless communications network 130 receives notice of a call being placed from a caller beyond the PSTN 120. That is, a call is being placed to one of the wireless transceivers 100, and therefore, a request for a link between the two-way radio console 105 and the individual transceiver 100 is being made. In addition, the caller is also, in effect, requesting a link between the PSTN 120 and the audio switch 110, via standard PBX 215.

At step S405, PBX 215 conveys the request to adjunct controller 200. At step S410, adjunct controller 200 determines a proper protocol with which to process the request. That is, adjunct controller 200 determines the identity of the called party, the availability of a link between the CO and the called party, etc. in deciding a proper protocol. For example, the adjunct controller 200 communicates with the two-way radio console 125 to determine whether there arc any available wireless links to handle the call request. As another example, the adjunct controller 200 determines whether the intended recipient is a proper party to receive a call from the incoming number, etc.

At step S415, the adjunct controller 200 determines whether a specific QSIG procedure exists within the PBX 215, which can be invoked via CTI 205 for processing the incoming call. QSIG, as described above, is a signaling protocol.

At step S420, if QSIG is available for the proper protocol, the adjunct controller 200 instructs the PBX 215, via CTI 205 to execute a specific QSIG sequence (e.g., do not allow call to go through and send back a "no available links, try again later" message to the user if no wireless Link is currently available, etc.).

If, in the above described example, no QSIG sequence is available to the adjunct controller 200, it will then instruct the PBX 215 to carry out the proper protocol via a Vector Directory Number (VDN) script, as described above, at step S425. Finally, at step S430, the proper protocol, selected by the adjunct controller 200, and carried out by either QSIG or VDN scripts, is completed.

The present invention provides a system and method for using a standard, less expensive, and more reliable PBX for interfacing with a wireless (e.g., cellular, etc.) communications network and the PSTN. The system employs an adjunct controller and uses computer telephony integration (CTI) technology associated with a standard PBX to communicate with both the wireless network and the PSTN. Through the use of CTI, the standard PBX also provides feedback of call status to the caller.

While a preferred embodiment of the invention has been described and illustrated, it should be readily apparent that many modifications can be made to the invention without departing from its spirit or scope. For example, although only a few exemplary protocols have been described for purposes of simplicity, it should be readily apparent that any number of different protocols may be developed by a particular wireless communications service provider to fit the needs of a particular customer user. In addition, while specific components have been depicted as being employed and coupled in a particular manner, the actual components may vary as well as the manner in which they are coupled together without departing from the spirit and scope of the invention which is to provide a system and method for interfacing a standard PBX with a wireless communications network and also with the PSTN. Accordingly, the invention is not limited by the foregoing description or drawings, but is only limited by the scope of the appended claims.

What is claimed as new and desired to be protected by Letters Patent of the United States is:

1. A method for handling call requests, comprising:
providing a private network including a plurality of private branch exchanges, the private branch exchanges being connectable to and being compatible with a public switched telephone network, and being connectable to but not being compatible with a wireless communication network;
providing a plurality of controllers having computer integration technology on the private network;
coupling one of the controllers to each of the plurality of private branch exchanges and to the wireless communication network, each of said controllers being capable of instructing the corresponding private branch exchange to which it is coupled to execute a proper protocol via computer telephony integration;
receiving a request at one of the controllers to complete a call originating from a wireless communication device to a central office;
executing a program in the controller corresponding said one of the private branch exchanges for determining whether or not a predetermined condition has been met, and if the predetermined condition has been met, determining said proper protocol for processing said request; and
instructing said one private branch exchange receiving said call request to execute said proper protocol,
thereby enabling completion of said call originating from the wireless communication device to the central office.

2. The method as in claim 1, wherein said act of determining comprises determining whether an appropriate signaling protocol is available for enabling completion of said call.

3. The method as in claim 2, wherein said act of determining whether an appropriate signaling protocol is available comprises determining whether a Q signal sequence is available for enabling said private branch exchange to communicate with at least one of said public switched telephone network and an audio switch associated with said wireless communications device.

4. The method as in claim 1, wherein said act of instructing further comprises instructing said private branch exchange to communicate with a said public switched telephone network.

5. The method as in claim 4 further comprising instructing said private branch exchange to communicate with said wireless communications device.

6. The method as in claim 5, wherein said act of instructing comprises instructing said private branch exchange to communicate with said wireless communications device via an audio switch.

7. The method as in claim 6, wherein said act of instructing comprises instructing said private branch exchange to communicate with said wireless communications device via a two-way radio console and said audio switch.

8. The method as in claim 5 further comprising instructing said private branch exchange to communicate status of said call to said wireless communications device.

9. The method as in claim 8, wherein said act of instructing comprises instructing said private branch exchange to communicate a busy signal to said wireless communications device when an intended receiving device of said call is not available to accept said call.

10. The method as in claim 8, wherein said act of instructing comprises instructing said private branch exchange to communicate a verbal message to said wireless communications device.

11. The method as in claim 4, wherein said act of instructing said private branch exchange comprises instructing said private branch exchange to communicate with said public switched telephone network by executing a predetermined set of instructions.

12. The method as in claim 11, wherein said act of instructing said private branch exchange comprises instructing said private branch exchange to execute a predetermined signaling protocol.

13. The method as in claim 12, wherein said act of instructing said private branch exchange comprises instructing said private branch exchange to execute a Q signal sequence.

14. The method as in claim 11, wherein said act of instructing said private branch exchange comprises instructing said private branch exchange to execute a call vector.

15. A method for handling call requests, comprising:
providing a private network including a plurality of private branch exchanges, the private branch exchanges being connectable to and being compatible with a public switched telephone network, and being connectable to but not being compatible with a wireless communication network;
providing a plurality of controllers having computer integration technology on the private network;
coupling one of the plurality of controllers to each of the plurality of private branch exchanges and to the wireless communication network, each of said controllers being capable of instructing the corresponding private branch exchange to which it is coupled to execute a proper protocol via computer telephony integration;
receiving a request at one of the private branch exchanges to complete a call originating from a central office to a wireless communication device;
executing a program in the controller corresponding to said one of the private branch exchanges for determining whether or not a predetermined condition has been met, and if the predetermined condition has been met, determining said proper protocol for processing said request; and
instructing said one private branch exchange receiving said call request to execute said proper protocol,
thereby enabling completion of said call originating from the central office to the wireless communication device.

16. The method as in claim 15, wherein said act of determining comprises determining whether an appropriate signaling protocol is available for enabling said private branch exchange to communicate with at least one of said public switched telephone network and an audio switch associated with said wireless communications device.

17. The method as in claim 16, wherein said act of determining whether an appropriate signaling protocol is available comprises determining whether a Q signal sequence is available for enabling completion of said call.

18. The method as in claim 15, wherein said act of instructing further comprises instructing said private branch exchange to communicate with said public switched telephone network.

19. The method as in claim 18 further comprising instructing said private branch exchange to communicate with said wireless communications device.

20. The method as in claim 19, wherein said act of instructing comprises instructing said private branch exchange to communicate with said wireless communications device via an audio switch.

21. The method as in claim 20, wherein said act of instructing comprises instructing said private branch exchange to communicate with said wireless communications device via a two-way radio console and said audio switch.

22. The method as in claim 19 further comprising instructing said private branch exchange to communicate status of said call to said central office.

23. The method as in claim 22, wherein said act of instructing comprises instructing said private branch exchange to communicate a busy signal to said central office when said wireless communications device is not available to receive said call.

24. The method as in claim 22, wherein said act of instructing comprises instructing said private branch exchange to communicate a verbal message to said central office.

25. The method as in claim 18, wherein said act of instructing said private branch exchange comprises instructing said private branch exchange to communicate with said public switched telephone network by executing a predetermined set of instructions.

26. The method as in claim 25, wherein said act of instructing said private branch exchange comprises instructing said private branch exchange to execute a predetermined signaling protocol.

27. The method as in claim 26, wherein said act of instructing said private branch exchange comprises instructing said private branch exchange to execute a Q signal sequence.

28. The method as in claim 25, wherein said act of instructing said private branch exchange comprises instructing said private branch exchange to execute a call vector.

29. A system for handling call requests, comprising:
a private network having plurality of private branch exchanges being connectable to and being compatible with a public switched telephone network, and being connectable to but being not compatible with a wireless communication network, thus preventing the private branch exchanges from communicating with the wireless communication network,
the private network also having a plurality of controllers having computer integrated technology, each of said controllers being coupled to one of the private branch exchanges and the wireless communication network and for determining whether or not a predetermined condition has been met, instructing a corresponding one of the plurality of private branch exchanges with regard to communicating between the wireless communication network and the public switched telephone network, and
if the predetermined condition has been met, enabling each of the private branch exchanges to communicate outgoing and incoming calls between the wireless communications network and the public switched network.

30. The system as in claim 29 further comprising said wireless communication network.

31. The system as in claim 30, wherein said wireless communication network comprises an audio switch coupled to said private branch exchange and also coupled to said controller for enabling communication between said wireless communication network and said public switched telephone network.

32. The system as in claim 31, wherein said wireless communication network comprises a two-way radio console coupled to said audio switch and also coupled to said controller for enabling communication between said wireless communication system and said public switched telephone network.

33. The system as in claim 32, wherein said wireless communication network comprises a plurality of wireless communication devices, each of said devices being capable of communicating with said two-way radio console via a wireless link.

34. The system as in claim 33, wherein said plurality of wireless communication devices comprise a plurality of wireless transceivers.

35. The system as in claim 29, wherein said controller is an adjunct controller.

36. The system as in claim 29, wherein said private branch exchange is a DEFINITY® private branch exchange.

37. The system as in claim 29, wherein said controller is configured to:
receive a request to complete a call in a direction from a wireless communication device to a central office, or vice versa;
determine proper protocol for processing said request; and
instruct said private branch exchange to execute said proper protocol via said computer telephony integration technology, thereby enabling completion of said call.

38. The system as in claim 29, wherein said controller is configured to determine whether an appropriate signaling protocol is available for enabling said private branch exchange to communicate with at least one of said public switched telephone network and an audio switch associated with said wireless communications device.

39. The system as in claim 29, wherein said controller is configured to determine whether a Q signal sequence is available for enabling completion of said call.

40. The system as in claim 29, wherein said controller is configured to instruct said private branch exchange to communicate with a wireless communication device of said wireless communication network.

41. The system as in claim 29, wherein said controller is configured to instruct said private branch exchange to communicate status of said call to either said central office or a wireless communication device of said wireless communication network.

42. The system as in claim 29, wherein said controller is configured to instruct said private branch exchange to communicate a busy signal to either said central office or a wireless communication device of said wireless communication network in response to said call request when an intended receiving device of said call is not available to receive said call.

43. The system as in claim 29, wherein said controller is configured to instruct said private branch exchange to communicate a verbal status message to either said central office or a wireless communication device of said wireless communication network in response to said call request.

44. The system as in claim 29, wherein said controller is configured to instruct said private branch exchange to communicate with said public switched telephone network by executing a predetermined set of instructions.

45. The system as in claim 29, wherein said controller is configured to instruct said private branch exchange to communicate with said public switched telephone network by executing a signaling protocol.

46. The system as in claim 29, wherein said controller is configured to instruct said private branch exchange to execute a Q signal sequence for communicating with said public switched telephone network.

47. The system as in claim 29, wherein said controller is configured to instruct said private branch exchange to execute a call vector for communicating with said public switched telephone network.

48. A system for handling call requests, including
a private network having an adjunct controller coupled to a private branch exchange, the adjunct controller also being coupled to a wireless communication network,
the private branch exchange being connectable to and being compatible with a public switched telephone network, and being connectable to but not compatible with the wireless communication network,
the adjunct controller having computer telephony integration technology for executing a program in order to determine whether or not a predetermined condition has been met, instructing the private branch exchange with regard to communicating between the wireless communication network and the public switched telephone network, and
if the predetermined condition has been met, enabling the private branch exchange to communicate between the wireless communications network and the public switched telephone network, so that calls originating at a central office may be completed to wireless devices on the wireless communications network, and other calls originating at the wireless devices on the wireless communication may be completed at the central office.

* * * * *